United States Patent
Kabir et al.

(10) Patent No.: US 11,177,761 B1
(45) Date of Patent: Nov. 16, 2021

(54) FAULT TOLERANT MODULAR MOTOR DRIVE SYSTEM

(71) Applicant: ABB Schweiz AG, Baden (CH)

(72) Inventors: Md Ashfanoor Kabir, Apex, NC (US); Bahareh Anvari, Raleigh, NC (US); Jukka T. Jarvinen, Greenville, SC (US); Ghanshyam Shrestha, Cary, NC (US)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 17/015,920

(22) Filed: Sep. 9, 2020

(51) Int. Cl.
- *H02P 1/32* (2006.01)
- *H02P 3/20* (2006.01)
- *H02P 9/06* (2006.01)
- *H02P 29/028* (2016.01)
- *H02P 27/06* (2006.01)
- *H02P 25/22* (2006.01)

(52) U.S. Cl.
CPC ............ *H02P 29/028* (2013.01); *H02P 25/22* (2013.01); *H02P 27/06* (2013.01)

(58) Field of Classification Search
CPC ......... H02P 29/028; H02P 27/06; H02P 25/22
USPC ........................................................ 318/496
See application file for complete search history.

(56) References Cited

U.S. PATENT DOCUMENTS

| | | | |
|---|---|---|---|
| 7,786,643 | B2 | 8/2010 | Bade et al. |
| 9,812,934 | B2 | 11/2017 | Mukunoki |
| 2013/0076190 | A1 | 3/2013 | Jarvinen et al. |
| 2016/0173019 | A1 | 6/2016 | Dajaku et al. |
| 2017/0353083 | A1 | 12/2017 | Shrestha et al. |

*Primary Examiner* — Erick D Glass
(74) *Attorney, Agent, or Firm* — Leydig, Voit & Mayer, Ltd.

(57) ABSTRACT

An electric machine includes a rotor and a stator. The stator includes a stator core having a plurality of slots. The stator further includes a plurality of drive modules configured to collectively produce an aggregate rotating magnetic field. Each respective drive module includes a power supply configured to generate a respective poly-phase alternating current (AC) output and is connected to a plurality of respective conductor windings. Each respective conductor winding includes a plurality of respective conductors, each respective conductor configured to carry a respective phase of the respective poly-phase AC output. Each respective drive module is configured to generate a rotating, poly-phase, multipole magnetic field. The rotating, poly-phase, multipole magnetic field is a superimposition of a plurality of respective mono-phase, multiple magnetic fields being generated by a respective conductor of the respective conductor winding.

20 Claims, 6 Drawing Sheets

FAULT TOLERANT MODULAR MOTOR DRIVE SYSTEM

FIELD

The present invention relates to an electric machine and to a method for operating an electric machine, and more particularly, to a fault tolerant motor drive system and a method for operating a fault tolerant motor drive system.

BACKGROUND

Electric machines, such as electric motors, convert electrical energy into mechanical energy. In an electric motor, an electric current induces a magnetic field that can provide a magneto-motive force (MMF). A mechanism is provided for periodically changing a direction of the current in order to introduce a time-variance into the induced magnetic field. The time-variance ensures that the MMF brings about rotational motion of a rotor.

A motor operated by a single drive has limited reliability and single point of failure. With a single drive feeding the motor, a high device rating is also required. Under a single phase fault, such a motor will shut down or operate under a reduced phase operation with significantly degraded performance. Moreover, the use of a single drive localizes thermal losses thereby creating challenges for cooling.

SUMMARY

The present disclosure describes electric machines and methods for operating electric machines that provide improved fault tolerance, higher performance, better efficiency during extended speed and partial load operation, and superior thermal management. The electric machines include distributed wound stators having a modular structure composed of a plurality of drive modules. Each drive module can include a power supply that generates a poly-phase AC output that can be supplied to a plurality of conductors. The conductors can form a distributed winding. The distributed winding of each drive module can be uniformly distributed about the periphery of the stator.

In the electric machines, each of the plurality of drive modules is configured to generate an independent rotating magnetic field. Therefore, the plurality of drive modules are collectively configured to generate a plurality of rotating magnetic fields, which together create a rotating magnetic field in the machine. The rotating magnetic field is a vector sum of the individual magnetic fields from each of the inverter modules. The number of redundancies in the magnetic field, as will be described hereinafter, is equal or depends on the number of inverters or drive modules of the machine. As a result, if a fault in a particular drive module impairs the capability of that particular drive module to generate a rotating magnetic field, the rotating magnetic fields generated by the remaining drive modules will continue to drive the electric machine. Similarly, if a fault in a particular drive module renders that particular drive module incapable of generating one or more phases of the poly-phase AC output, the impact of the resulting rotational asymmetry in the rotating magnetic field generated by that particular drive module will be mitigated by the rotating magnetic fields generated by the remaining drive modules. As a result, these multi-drive module electric machines exhibit considerably improved fault tolerance as compared with prior art electric machines. In particular, the multi-drive module electric machines provide a fault tolerant integrated motor drive capable of sustaining multiple module faults up to a point where at least one drive module remains operational. As long as one drive module remains operational, the electric machine can operate with a balanced, poly-phase (e.g. three phase) supply.

Each individual drive module of the plurality of drive modules can be controlled independently of the remaining drive modules. As a result, the poly-phase AC outputs produced by the plurality of drive modules can be phase shifted relative to one another. Due to phase shifting of the poly-phase AC outputs produced by different ones of the plurality of drive modules, the multi-drive module electric machines are able to generate a higher average torque with a lower torque ripple as compared to prior art electric machines (e.g. conventional three phase electric machines). The electric machines described herein thereby provide for the operating speed range to be extended and also provide for operation under partial loads with higher machine efficiency because (i) all modules are not required to be operated simultaneously and (ii) the individual drive modules can be operated at a lower rating than their rated condition.

In the multi-drive module electric machines, each drive module is connected to a distributed winding that can be placed into stator slots of a stator core. The distributed windings can be provided, according to various implementations, in the form of wave windings as well as lap windings. The windings can utilize, according to various implementations, hairpin/bar conductors as well as stranded coil conductors. The hairpin/bar conductors can be uniformly shaped and can be produced according to state-of-the-art manufacturing processes.

The stator core includes a number of slots into which the conductors of the distributed windings can be placed. The multi-drive module electric machines are not limited to any specific slot per pole per phase (q) or pole number combinations. By utilizing uniformly shaped conductors that are uniformly distributed about the periphery of the stator, the multi-drive module electric machines can provide symmetric stator flux profiles. Furthermore, because each drive module is connected to an independent uniformly distributed winding, the multi-drive module electric machines can provide a symmetric stator flux profile and a uniformly rotating magnetic field even in the event of a fault that causes the failure of one or more drive modules. In addition, because the drive modules are uniformly distributed about the periphery of the stator, and because corresponding windings of different drive modules are offset relative to one another about the periphery of the stator, the thermal load generated during operation of the multi-drive module electric machines can be more uniformly distributed. As a result, more effective cooling can be achieved.

Each drive module includes an inverter configured to convert a DC input into the poly-phase AC output. The inverters can be distributed in a uniform fashion about the periphery of the stator and can be connected in parallel to a common DC bus. Each inverter can supply the poly-phase AC output to a corresponding distributed winding and thereby generates a rotationally symmetric magnetic flux distribution that gives rise to a uniformly rotating magneto-motive force (MMF) in the electric machine. A uniform distribution of the inverters about the periphery of the stator distributes losses and hot spots from the drive modules in a uniform manner about a housing of the electric machine and thereby promotes effective cooling. Each inverter can be a standard three-phase inverter that converts a DC input, which is supplied by the common DC bus, to a three-phase AC output. The use of standard three-phase inverters, which are well established in the industry and provide off-the-shelf availability, enables the multi-drive module electric machines to be produced and manufactured at lower cost as compared with fault tolerant electric machines that require bespoke power supply solutions. In particular, as compared with fault tolerant electric machines that require bespoke power supply systems, the multi-drive module electric machines described herein provide for lower costs of production/manufacture by requiring fewer components and/or by utilizing less complex controllers.

According to an embodiment, an electric machine is provided. The electric machine includes a rotor and a stator. The stator includes a stator core having a plurality of slots. The stator further includes a plurality of respective drive modules, the plurality of respective drive modules being configured to collectively produce an aggregate rotating magnetic field. Each respective drive module includes a power supply configured to generate a respective poly-phase alternating current (AC) output, the respective poly-phase AC output having a plurality of respective phases. Each respective drive module is connected to a plurality of respective conductor windings, each respective conductor winding including a plurality of respective conductors, each respective conductor configured to carry a respective phase of the respective poly-phase AC output. Each respective drive module is configured to generate a respective rotating, poly-phase, multipole magnetic field, the respective rotating, poly-phase, multipole magnetic field being a superimposition of a plurality of respective mono-phase, multiple magnetic fields, each respective mono-phase, multipole magnetic field being generated by a respective conductor of the respective conductor winding carrying a respective phase of the respective poly-phase AC output. Each respective rotating, poly-phase, multipole magnetic field is configured to interact with the rotor to produce a respective magneto-motive force (MMF) that causes the rotor to rotate. The aggregate rotating magnetic field is a superimposition of the plurality of respective rotating, poly-phase, multipole magnetic fields generated by the plurality of respective drive modules.

According to an embodiment, a method is provided for operating an electric machine. The method includes independently controlling a plurality of respective drive modules to generate an aggregate rotating magnetic field, the aggregate rotating magnetic field being a superimposition of a plurality of rotating, poly-phase, multipole magnetic fields, each respective rotating, poly-phase, multipole magnetic field being generated by a single respective drive module. Each respective drive module includes a power supply configured to generate a respective poly-phase alternating current (AC) output, the respective poly-phase AC output having a plurality of respective phases, and a plurality of respective conductor windings, each respective conductor winding including a plurality of respective conductors, each respective conductor configured to carry one respective phase of the respective poly-phase AC output. Each respective rotating, poly-phase, multipole magnetic field is a superimposition of a plurality of respective mono-phase, multiple magnetic fields, each respective mono-phase, multipole magnetic field being generated by a respective conductor of the respective conductor winding carrying a respective phase of the respective poly-phase AC output. Each respective rotating, poly-phase, multipole magnetic field is configured to interact with a rotor to produce a respective magneto-motive force (MMF) that causes the rotor to rotate.

BRIEF DESCRIPTION OF THE DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following.

DETAILED DESCRIPTION

Figure 1:
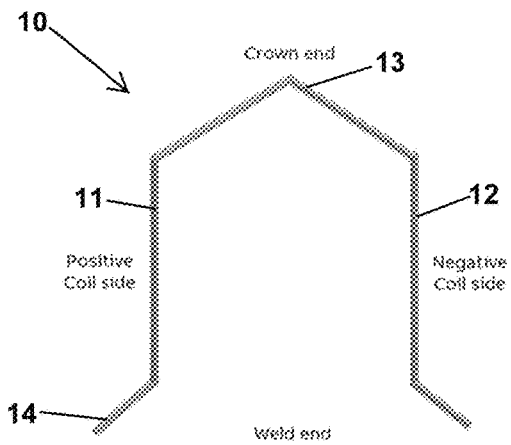
FIG. 1 illustrates the layout of a single hairpin/bar conductor for use in an electric machine according to an embodiment.

The present disclosure describes multi-drive module electric machines and methods for operating multi-drive module electric machines. The electric machines according to various embodiments have various numbers of phases, poles, stator slots, and drive modules. The number of drive modules is determined by the number of hairpin/bar conductors per stator slot (Z1) and q number. The electric machines described herein are applicable to q values either larger, smaller, or equal to 2*P if Z1*q is an integer multiple of the number of drive modules ($N_{inv}$). Feasible values of $N_{inv}$ are positive integers and the remainder of Z1*q divided by $N_{inv}$ should be 0, which can be represented as: $N_{inv} \in N$ (wherein N is the set of natural numbers) and modulo(Z1*q, $N_{inv}$)=0. Different number of drive modules are possible for certain Z1 and q combinations, and Table 1 lists feasible numbers of drive modules for the multi-drive module concept ($N_{inv} \geq 2$) described herein. Table 1 lists some but not all examples of theoretically possible numbers of drive modules for certain Z1 and q combinations. However, it is generally not practical to have large number of drive modules. To increase the voltage rating of the drive modules, multiple phase conductors within a slot/pole can be connected in series with a lower number of $N_{inv}$. For example, with Z1=8 and q=4, and electric machine with $N_{inv}$=8 can have 4 series, 2 series and 2 parallel, or 4 parallel conductors per module, while an electric machine with $N_{inv}$=4 can have 8 series conductors, 2 parallel branches of 4 series conductors, 4 parallel branches of 2 series conductors, or 8 parallel conductors per module.

TABLE 1

List of feasible $N_{inv}$ for different Z1 and q values

| Z1 | 1 | 2 | 3 | 4 | 5 | 6 |
|---|---|---|---|---|---|---|
| 2 | 2 | 2, 4 | 2, 3, 6 | 2, 4, 8 | 2, 5, 10 | 2, 3, 4, 6, 12 |
| 4 | 2, 4 | 2, 4, 8 | 2, 3, 4, 6, 12 | 2, 4, 8, 16 | 2, 4, 5, 10, 20 | 2, 3, 4, 6, 8, 12, 24 |
| 6 | 2, 3, 6 | 2, 3, 4, 6, 12 | 2, 4, 8, 16 | 2, 3, 4, 6, 8, 12, 24 | 2, 3, 5, 6, 10, 15, 30 | 2, 3, 4, 6, 9, 12, 18, 36 |
| 8 | 2, 4, 8 | 2, 4, 8, 16 | 2, 3, 4, 6, 8, 12, 24 | 2, 4, 8, 16, 32 | 2, 4, 5, 8, 10, 20, 40 | 2, 3, 4, 6, 8, 12, 16, 24, 48 |
| 10 | 2, 5, 10 | 2, 4, 5, 10, 20 | 2, 3, 5, 6, 10, 15, 30 | 2, 4, 5, 8, 10, 20, 40 | 2, 5, 10, 25, 50 | 2, 3, 4, 5, 6, 10, 12, 15, 20, 30, 60 |

According to various embodiments, stator windings can be provided as wave windings (which are common for hairpin/bar conductors) but can also be provided as lap windings. For a wave winding, the winding progresses forward in the stator covering the whole stator periphery. For automation of winding, the bar conductors can be pre-shaped to constitute one positive and one negative coil side. The bar conductors can then be inserted into stator slots and their end-connections can be made at a weld-end side. For standard manufacturing of the hairpin/bar winding, the crown-end for each hairpin/bar can have a constant shape. Utilizing the distributed winding structure, drive modules can be placed uniformly along the stator periphery.

According to various embodiments, the stator windings can be formed from either hairpin/bar conductors or stranded coil conductors and can be provided in the form of integral-slot windings (q is an integer) or in the form of fractional-slot windings (q is not an integer). Embodiments of the present disclosure are not limited to any specific slot-per-pole-per-phase to pole number relationship, are not limited to outer rotor or inner rotor configurations, and are not limited to any specific number of poles, phases, stator slots, or rotor slots. In addition, embodiments of the present disclosure can be utilized in permanent magnet motors, synchronous and asynchronous induction motors, and reluctance motors. Furthermore, embodiments of the present disclosure are applicable to both axial and radial flux topologies and are not limited to any power or speed of application.

An electric machine according to an embodiment includes a rotor and a stator, the stator having a stator core and a plurality of drive modules. The stator core has a plurality of slots, and the plurality of drive modules are configured to collectively produce an aggregate rotating magnetic field. Each respective drive module includes a power supply configured to generate a respective poly-phase alternating current (AC) output, the respective poly-phase AC output having a plurality of respective phases. Each respective drive module is connected to a plurality of respective conductor windings, each respective conductor winding including a plurality of respective conductors, each respective conductor configured to carry a respective phase of the respective poly-phase AC output. Each respective drive module is configured to generate a respective rotating, poly-phase, multipole magnetic field, the respective rotating, poly-phase, multipole magnetic field being a superimposition of a plurality of respective mono-phase, multiple magnetic fields, each respective mono-phase, multipole magnetic field being generated by a respective conductor of the respective conductor winding carrying a respective phase of the respective poly-phase AC output. Each respective rotating, poly-phase, multipole magnetic field is configured to interact with the rotor to produce a respective magneto-motive force (MMF) that causes the rotor to rotate. The aggregate rotating magnetic field is a superimposition of the plurality of respective rotating, poly-phase, multipole magnetic fields generated by the plurality of respective drive modules. The electric machine is, e.g., a motor drive system.

Each respective drive module can be configured to be operated independently from each other respective drive module, and the electrical machine can further include a controller configured to control each of the drive modules independently of the other drive modules. The controller can be configured to determine that a fault has occurred in a respective drive module, to shut down the respective faulty drive module, and to adjust one or more operating parameters of the remaining healthy drive modules. The controller can additionally or alternatively be configured to determine that a load demanded of the electric machine falls below a threshold value, shut down, in response to determining that the demanded load falls below the threshold value, one or more of the plurality of respective drive modules, and adjust one or more operating parameters of the remaining active drive modules. The controller can additionally or alternatively be configured to determine a torque-speed requirement demanded of the electric machine, and select, based on the demanded torque-speed requirement, one or more of the plurality of respective drive modules to be operated and operating parameters for each of the one or more respective drive modules to be operated. In other words, for operation under rated power at higher speeds, individual inverter modules can be brought online or offline based on the torque-speed requirement of the machine thereby ensuring optimal utilization of the drive modules and enhancing overall operating efficiency of the motor drive system under variable load conditions.

The controller can be a component of, or can include, a central control board that communicates with each individual drive module. The central control board can be programmed to command individual drive modules to operate at higher current levels depending on a margin in the required service time or performance under fault. Such control can provide for higher torque to compensate for a torque drop resulting from a fault, e.g. a faulted coil elsewhere in the machine.

The respective power supply can include a respective poly-phase inverter configured to convert a direct current (DC) input into the respective poly-phase AC output. The electric machine can include a DC bus, the plurality of drive modules can be connected in parallel to the DC bus, and the DC bus can be configured to supply the DC input to each respective poly-phase inverter. In order to monitor machine health, a controller can be configured to monitor each of the drive modules and/or the poly-phase inverter of each of the drive modules and/or the poly-phase inverters of each of the drive modules can communicate with one another. A controller can additionally or alternatively be configured to control each respective poly-phase inverter using, e.g., conventional vector or field oriented control with sine or space vector pulse width modulation (PWM). Each inverter module—and the plurality of inverter modules collectively—can provide balanced flux density distribution to the motor, and current and MMF balance can be maintained even under different fault conditions. Specifically, the drive modules can provide balance in phase currents and MMFs to ensure smooth torque profiles under fault conditions while also ensuring operation of the machine so long as at least one module is operating, thereby significantly improving machine fault tolerance and reliability.

The plurality of slots of the stator core can be a number Q of slots, the plurality of respective drive modules can be a number $N_{inv}$ of respective drive modules, and each respective rotating, poly-phase, multipole magnetic field can have a number 2P of poles. The plurality of respective phases of each respective poly-phase AC output can be a number n of phases. The numbers p, $N_{inv}$, P, and n can be positive integers. The stator core can be divided into the number 2P of respective sectors, each respective sector including an integer number Q/2P of the Q slots. Each respective sector can be divided into the number n of respective segments, each respective segment including a number q of slots, wherein $$q = \frac{\frac{Q}{2P}}{n},$$

and wherein q is a positive integer or a fraction. Each of the q slots of each respective segment can be occupied by a respective conductor of the respective conductor winding connected to a different respective drive module.

Each respective phase of each respective poly-phase AC output of a respective drive module can correspond to a single phase of the respective poly-phase AC output of each other respective poly-phase AC output, and the q slots of each respective segment can be occupied by respective conductors that carry corresponding phases of the respective poly-phase AC outputs of the plurality of drive modules.

Each respective drive module can be assigned a drive module number, and the slots of each respective segment can be assigned to respective conductors of respective drive modules in an order corresponding to the assigned drive module numbers, the order of respective conductors of respective drive modules being identical for every segment.

Each respective poly-phase AC output of a respective drive module can have a phase shift relative to each other respective poly-phase AC output. Each drive module can be operated with the same reference angle or with a shift angle equal to the electrical slot pitch of the machine in order to provide an enhancement in average torque and a reduction in torque ripple. For example, each drive module can be assigned a number i, wherein i=1:$N_{inv}$, and the respective poly-phase AC output of the ith respective drive module can have a phase shift $$\theta_{shift} = \frac{q * \theta_{slot}}{i},$$

wherein $$q = \frac{\frac{Q}{2P}}{n}$$

and $\theta_{slot}$ is the slot pitch, in electrical degrees, of each of the plurality of respective conductor windings.

Each respective conductor winding can be a wave winding or a lap winding, and each respective conductor can be a bar conductor, e.g. a hairpin bar conductor, or a stranded coil conductor.

The total number of conductors from a single phase (Z1*q) can be an integer multiple of the number of drive modules ($N_{inv}$) for uniform distribution. The phase number of each drive modules can be equal to a machine phase number. The slot order from each phase for a particular drive module can be maintained the same as its module number. For example, a first drive module (designated module no. 1) is connected to the first slot conductor of each phase while a second drive module (designated module no. 2) is connected to the second slot conductor of each phase. Such allocation of the slot conductors to drive modules can ensure a balanced distribution of flux in the machine even under fault conditions, and as a result, the machine can maintain balanced, high performance operation as long as at least one drive module is operating.

Depending on application requirements, components of the electric machine can be constructed using Si, SiC, GaN, or materials including such elements and compounds. Additional or alternative materials can also be used.

The electric machine can be cooled using, e.g., air or liquid cooling methods and an active cooling channel can be placed between the motor frame and inverter to improve the thermal management of the machine. The drive modules can be uniformly distributed about the periphery of the stator in order to uniformly distribute power converter losses. Higher loss components from the drive can be placed in contact with a cooling channel casing, while the other radial end of the cooling channel can be placed in contact with a stator lamination stack. Lower loss components from the drive can be placed in contact with an outside heat sink structure.

A method according to an embodiment for operating an electric machine includes independently controlling a plurality of respective drive modules to generate an aggregate rotating magnetic field. The aggregate rotating magnetic field is a superimposition of a plurality of rotating, poly-phase, multipole magnetic fields. Each respective rotating, poly-phase, multipole magnetic field is generated by a single respective drive module. Each respective drive module includes a power supply configured to generate a respective poly-phase alternating current (AC) output, the respective poly-phase AC output having a plurality of respective phases, and a plurality of respective conductor windings, each respective conductor winding including a plurality of respective conductors, each respective conductor configured to carry a respective phase of the respective poly-phase AC output. Each respective rotating, poly-phase, multipole magnetic field is a superimposition of a plurality of respective mono-phase, multiple magnetic fields. Each respective mono-phase, multipole magnetic field is generated by a respective conductor of the respective conductor winding carrying a respective phase of the respective poly-phase AC output. Each respective rotating, poly-phase, multipole magnetic field is configured to interact with a rotor to produce a respective magneto-motive force (MMF) that causes the rotor to rotate.

According to an embodiment (to which FIGS. 1-10 correspond), a three-phase (phases A, B, and C), four-pole electric machine is provided that includes a stator with a stator core having a forty-eight (48) slot layout and four independent drive modules. As can be appreciated, this embodiment is exemplary and other arrangements can also be used. In the embodiment shown, each independent drive module (i) includes a standard three-phase inverter connected to a common DC bus and (ii) is connected to a distributed wave winding that includes pre-shaped bar conductors for each of the three-phases. Each inverter controls one slot conductor per pole per phase (i.e. q=1).

FIG. 1 illustrates the layout of a single hairpin/bar conductor. The hairpin/bar conductor 10 is pre-shaped to facilitate the automation of winding and includes a positive coil side 11 and a negative coil side 12 as well as a crown end 13 and weld ends 14. Each of the positive coil side 11 and the negative coil side 12 is inserted into a single stator slot (in accordance with the winding scheme illustrated in FIGS. 2 and 3, which are described herein below), and the weld ends 14 are connected to a corresponding output channel of the inverter. For standard manufacturing, the shape of the crown end 13 of each hairpin/bar conductor is identical.

Figure 2:
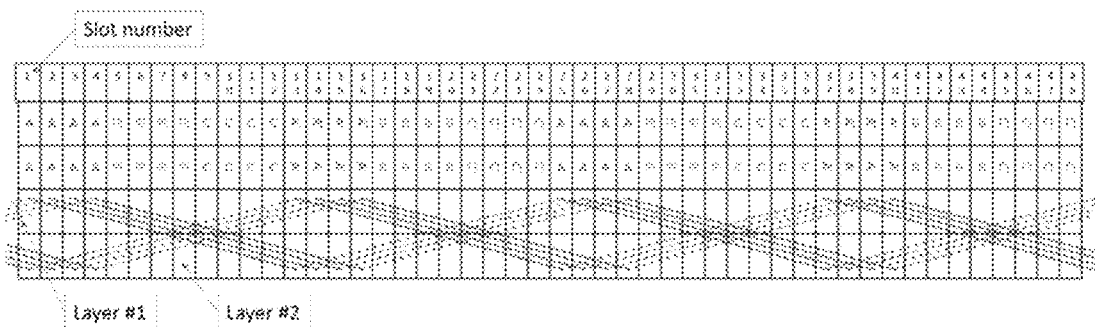
FIG. 2 illustrates the assignment of conductors of distributed conductor windings of independent drive modules of an electric machine according to an embodiment.

FIG. 2 illustrates the assignment of conductors of distributed conductor windings of independent drive modules of a four-pole, three-phase electric machine according to an embodiment. FIG. 2 illustrates (in the top two rows thereof) the assignment of conductors of the distributed windings of the four independent drive modules to the 48 stator slots. FIG. 2 also illustrates (in the bottom two rows thereof), for a single phase (phase A) of each of the four drive modules, crown ends of the hairpin/bar conductors (e.g. a crown end 13 of a hairpin/bar conductor 10 as illustrated in FIG. 1) that connect the positive coil sides and the negative coil sides occupying individual stator slots in a wave winding progression. The wave winding layout illustrated in FIG. 2 is a two-layer winding where each stator slot is occupied by two layers of hairpin/bar conductors that each correspond to the same phase of the three phase output provided by an inverter of a particular drive module. In particular, each of the stator slots 1-48 illustrated in FIG. 2 is occupied by two positive coil sides or two negative coil sides of hairpin/bar conductors (e.g. positive coil side 11 or negative coil side 12 of a hairpin bar conductor 10 as illustrated in FIG. 1). Although FIG. 2 illustrates a two-layer winding, alternative embodiments may include single layer windings as well as windings with more than two layers.

In the winding scheme illustrated in FIG. 2, the first slot from each phase for each pole is occupied by conductors of the first drive module, the second slot from each phase for each pole is occupied by conductors of the second drive module, the third slot from each phase for each pole is occupied by conductors of the third drive module, and the fourth slot from each phase for each pole is occupied by conductors of the fourth drive module. For example, stator slots 1, 13, 25, and 37 are all occupied by two layers of hairpin/bar conductors that each carries the phase A output of an inverter of a first drive module, and stator slots 2, 14, 26, and 38 are all occupied by two layers of hairpin/bar conductors that each carries the phase A output of an inverter of a second drive module. Therefore, each hairpin/bar conductor has a crown-end pitch of 12 stator slots. The uniform distribution provided by this scheme (in which, for each phase, the slot number occupied by conductors of a particular module corresponds to the module number) results in a uniform generation of magnetic flux by each drive module.

In the winding scheme illustrated in FIG. 2, the 48 stator slots are divided into four sectors, i.e. one sector for each pole. Each sector therefore includes twelve consecutive stator slots. Specifically, in the winding scheme illustrated in FIG. 2, stator slots 1-12 form a first sector, stator slots 13-24 form a second sector, stator slots 25-36 form a third sector, and stator slots 37-48 form a fourth sector. Each of the four sectors is divided into three segments, i.e. one segment for each phase. Each segment therefore includes four consecutive stator slots, i.e. one stator slot for each drive module. For example, in the winding scheme illustrated in FIG. 2, stator slots 1-4 form a first segment (for phase A current) of the first sector, stator slots 5-8 form a second segment (for phase B current) of the first sector, and stator slots 9-12 form a third segment (for phase C current) of the first sector. Furthermore, each stator slot of each segment is occupied by a conductor that is supplied with current by an inverter module different from the inverter modules that supply current to the conductors that occupy the other stator slots of the segment. For example, in the winding scheme illustrated in FIG. 2, stator slot 1 is occupied by a conductor that is supplied with current by a first standard three-phase inverter, stator slot 2 is occupied by a conductor that is supplied with current by a second standard three-phase inverter, stator slot 3 is occupied by a conductor that is supplied with current by a third standard three-phase inverter, and stator slot 4 is occupied by a conductor that is supplied with current by a fourth standard three-phase inverter.

In the winding scheme illustrated in FIG. 2, a single conductor controlled by one of the four drive modules occupies each stator slot of each segment. Although the winding scheme illustrated in FIG. 2 is for a three-phase, four-pole electric machine having a stator with a stator core that includes a forty-eight slot layout and four independent drive modules, alternative embodiments provide winding schemes for electric machines having different numbers of phases, poles, stator slots, and drive modules. In such embodiments, the number of phases is a number n of phases, the number of poles is a number 2P of poles, the number of slots in the stator core is a number Q of slots, and the number of drive modules is a number $N_{inv}$ of drive modules, wherein the numbers Q, $N_{inv}$, P, and n are positive integers. The stator core is divided into the number 2P of respective sectors, each respective sector including an integer number Q/2P of the Q slots, and each respective sector is divided into the number n of respective segments, wherein each respective segment includes a number q of slots, wherein $$q = \frac{\frac{Q}{2P}}{n},$$

and wherein q is a positive integer. Each of the q slots of each respective segment is occupied by a respective conductor of a respective conductor winding of a different respective drive module.

Figure 3:
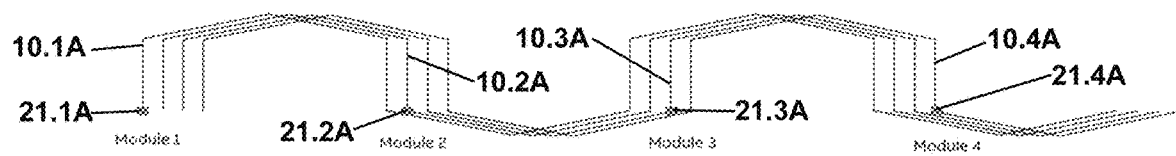
FIG. 3 illustrates the assignment of hairpin/bar conductors to a plurality of drive module inverters according to an embodiment.

FIG. 3 illustrates the assignment of hairpin/bar conductors, which carry a first phase (phase A) of a poly-phase AC output, to each of a plurality of drive modules (each of which includes a standard 3-phase inverter). The connections between the phase A outputs 21.1A, 21.2A, 21.3A, and 21.4A of the inverters of the four independent drive modules and phase A-carrying conductors 10.1A, 10.2A, 10.3A, and 10.4A of the respective conductor windings of each drive module are formed at different sectors such that the inverters are uniformly distributed about the periphery of the stator.

Figure 4A:
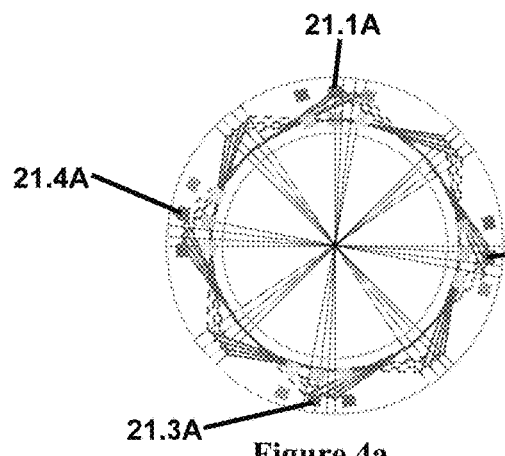
FIGS. 4a through 4c illustrate the placement of drive module inverters about a periphery of a stator for drive integrated solutions according to alternative embodiments.
Figure 4B:
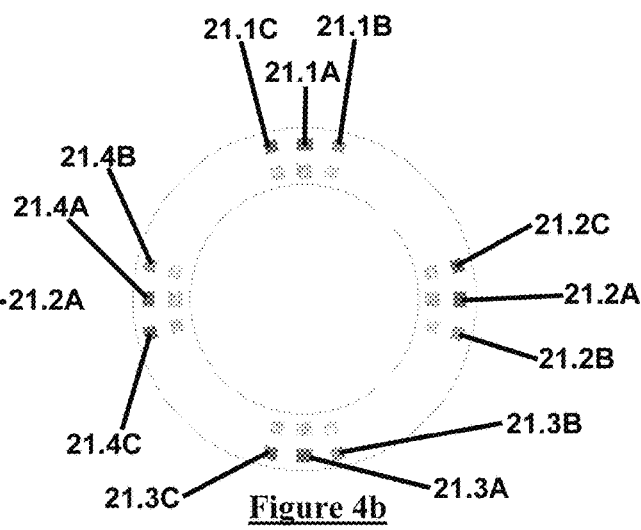
Figure 4C:
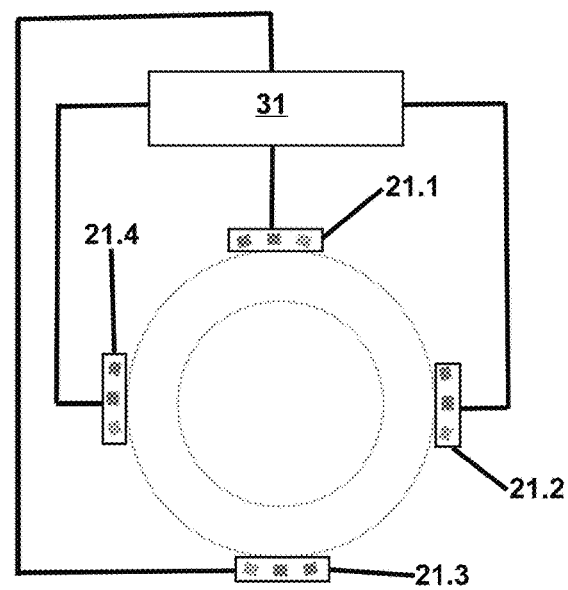

FIGS. 4a through 4c illustrate the placement of the inverters of the four drive modules about the periphery of the stator for drive integrated solutions according to alternative embodiments. FIG. 4a illustrates coil end to inverter connections for each drive module. Specifically, FIG. 4a illustrates the connections between phase A outputs 21.1A, 21.2A, 21.3A, and 21.4A of the inverters of the four independent drive modules and phase A-carrying conductors of the respective conductor windings of the four independent drive modules. In addition, FIG. 4a also illustrates phase B outputs 21.1B, 21.2B, 21.3B, and 21.4B and phase C outputs of the inverters of the four independent drive modules. The phase B- and phase C-carrying conductors of the respective conductor windings of the four independent drive modules are connected to the corresponding outputs of the inverters in the same manner as the phase A-carrying conductors illustrated in FIG. 4a. FIG. 4b illustrates face mounted inverters 21.1, 21.2, 21.3, and 21.4, and FIG. 4c illustrates side mounted inverters 21.1, 21.2, 21.3, and 21.4. FIG. 4c further illustrates the side mounted inverters 21.1, 21.2, 21.3, and 21.4 being connected to a common DC bus 31. For liquid cooled operation, the cooling channel can be placed between the motor frame and inverter. The power devices of the inverter (associated with higher losses) can be placed in the bottom layer and in contact with the cooling channel for conduction cooling, whereas the lower loss components can be positioned on the top surface for air-cooling. While in the illustrated embodiment, the inverters are shown mounted, e.g. via a housing, to the stator, in alternative embodiments the inverters 21.1, 21.2, 21.3, and 21.4 and the common DC bus 31 can be located remotely from the various stator windings. Positioning the inverters 21.1, 21.2, 21.3, and 21.4 and the common DC bus 31 remotely from the stator windings can be particularly advantageous for high power applications (where it may not be practical to mount the inverters as shown in FIGS. 4a through 4c).

Figure 5:
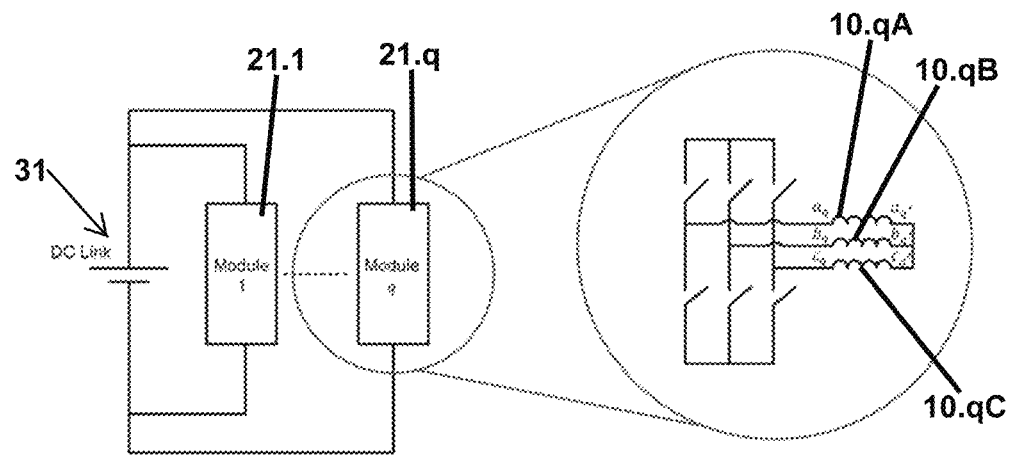
FIG. 5 illustrates a configuration of drive modules sharing a common DC bus in parallel according to an embodiment.

FIG. 5 illustrates the configuration of the inverters (21.1, . . . , 21.q—in the embodiment illustrated in FIGS. 1-4, q=4) of the drive modules sharing the common DC bus 31 in parallel. In FIG. 5, each inverter (e.g. 21.q) is controlling one slot conductor per pole per phase (e.g. conductors 10.qA, 10.qB, and 10.qC), which makes the current rating of each module a factor of $1/N_{inv}$ the current rating of a conventional three phase drive. FIG. 5 also illustrates the $N_{inv}^{th}$ (in the embodiment illustrated in FIGS. 1-4, q=$N_{inv}$=4) drive module consisting of a three phase inverter.

Figure 6:
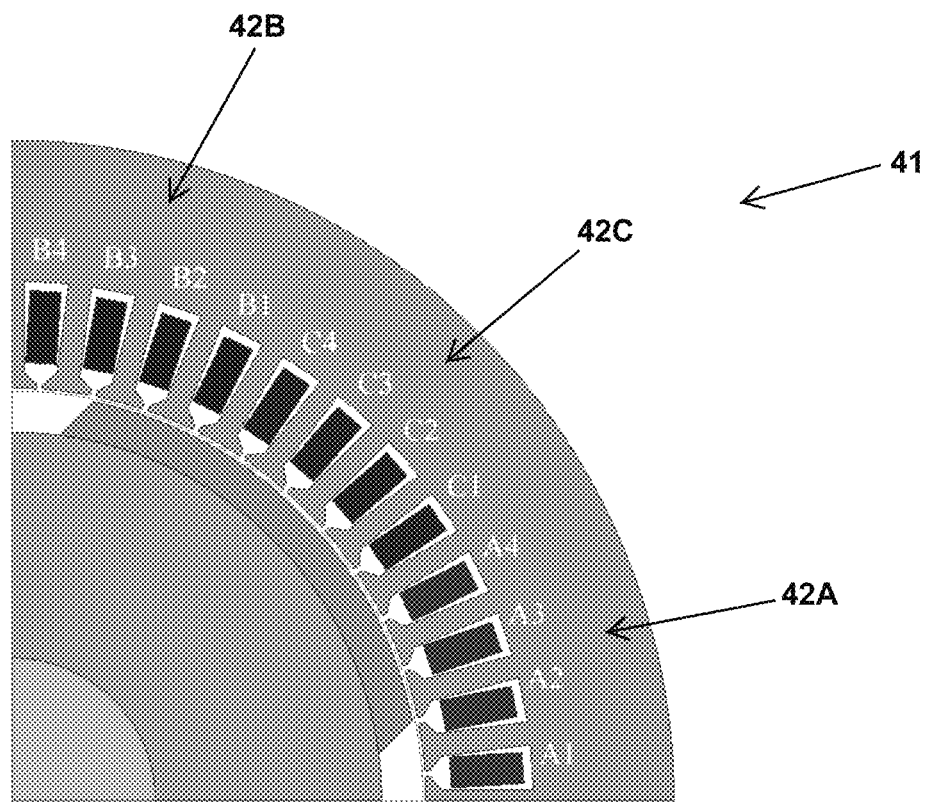
FIG. 6 illustrates a cross section that corresponds to a single pole of an electric machine according to an embodiment.

FIG. 6 illustrates a cross section that corresponds to a single pole of an electric machine, i.e. a cross section that corresponds to a single sector 41 of the stator core of a three-phase, four-pole electric machine having a stator with a stator core that includes a forty-eight slot layout and four independent drive modules. The sector of the stator core illustrated in FIG. 6 includes twelve stator slots that are divided into three segments 42A, 42B, and 42C—one for each phase. Each segment 42A, 42B, and 42C includes four consecutive stator slots, and the order in which drive modules are assigned to the consecutive stator slots of a segment is the same for each segment of the sector (as well as for segments of the other sectors that are not shown in FIG. 6). The stator slots of each segment of the sector include conductors of different drive modules. In other words, each stator slot of a particular segment 42A, 42B, and 42C includes a conductor connected to a drive module that is different than the drive modules to which the conductors that occupy the other stator slots of the particular segment 42A, 42B, and 42C are connected. However, all conductors that occupy the stator slots of a particular segment correspond to the same phase of AC output generated by the inverters of the drive modules. However, corresponding phases of AC output generated by the inverters of the drive modules can be phase shifted relative to one another—as is discussed in more detail herein below.

The fault tolerance of a three-phase, four-pole electric machine having a single layer distributed wound stator with forty-eight stator slots and a surface mounted permanent magnet rotor has been demonstrated experimentally. Specifically, transient finite element analyses (FEA) were performed where both healthy scenarios and three fault scenarios (scenarios with (a) one, (b) two, and (c) three inverter modules failing) were evaluated. The cross sectional geometry illustrated in FIG. 6 corresponds to the distributed winding used with the permanent magnet stator mount (PMSM) topology to demonstrate the fault tolerance of the three-phase, four-pole electric machine.

Figure 7:
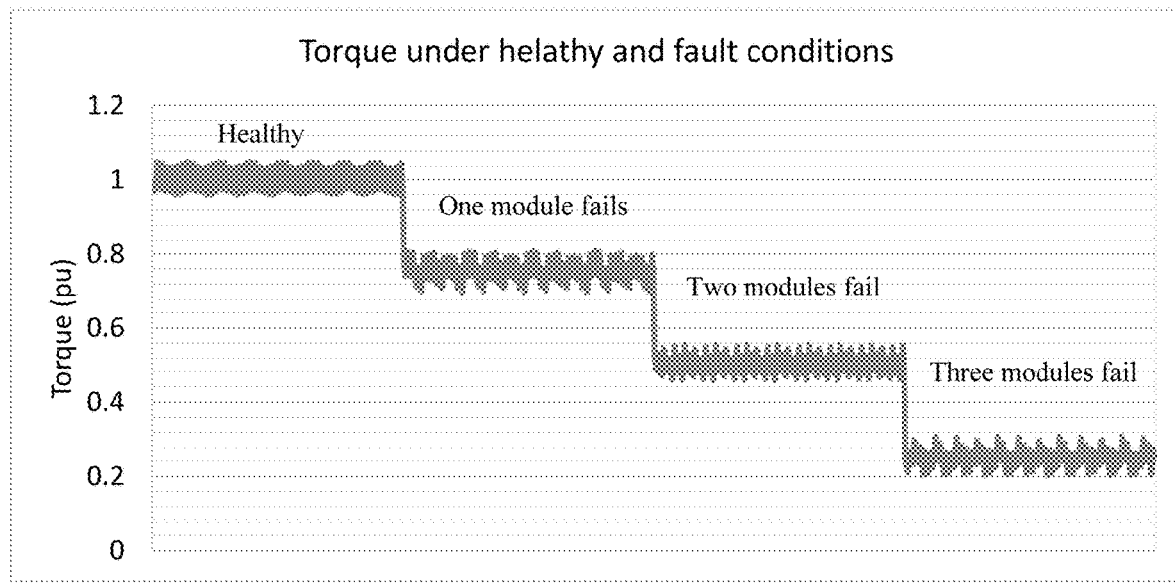
FIG. 7 illustrates dynamic torque profiles generated, under healthy and various faulty conditions, by a three-phase, four-pole electric machine according to an embodiment.

FIG. 7 illustrates dynamic torque profiles generated, under healthy and various faulty conditions, by a three-phase, four-pole electric machine according to an embodiment having a stator with a stator core that includes a forty-eight slot layout and four independent drive modules. FIG. 7 demonstrates that even during the fault operating conditions, electric machines described herein can ensure balanced phase currents and smooth machine torque. With failure in one module, the average torque decreases by 24%; with failure in two modules, the average torque decreased by 49%; and with failure in three modules, the average torque decreased by 75%. However, in all three fault scenarios the motor was able to continue operation with balanced three-phase currents and low torque ripple thereby demonstrating one of the advantages of the invention as compared to conventional electric machines that utilize a three phase inverter.

Figure 8:
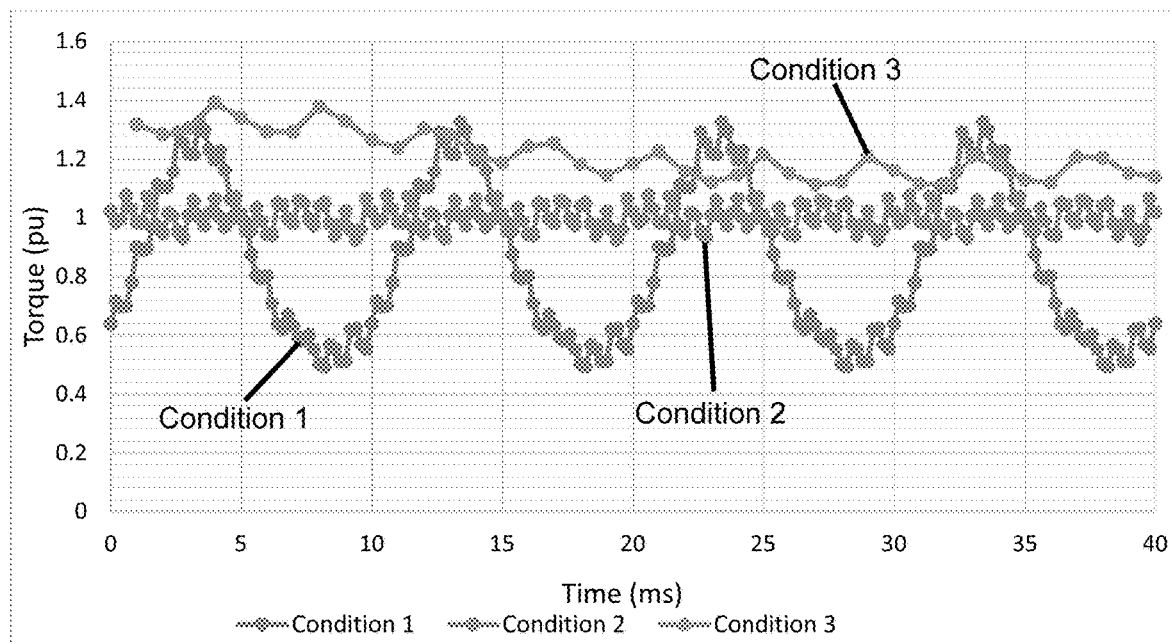
FIG. 8 illustrates fault operating conditions for a conventional electric machine with a three phase inverter and for a three-phase, four-pole electric machine according to an embodiment.

FIG. 8 illustrates fault operating conditions for a conventional electric machine with a three phase inverter and for a three-phase, four-pole electric machine according to an embodiment of the present disclosure. Specifically, FIG. 8 illustrates two-phase operation of a conventional electric machine with a three-phase inverter after one phase has failed (Condition 1), operation of the electric machine according to the present disclosure after one drive module has failed but with other modules operating with balanced three-phase supply (Condition 2), and operation of the electric machine according to the present disclosure after one phase of one drive module has failed (Condition 3). As shown in FIG. 8, as compared to Condition 1 for the conventional machine, the electric machine according to an embodiment of the present disclosure provides 15% higher average torque with 84% lower ripple under Condition 2 and provides 43% higher average torque with 76% lower ripple for Condition 3.

Figure 9A:
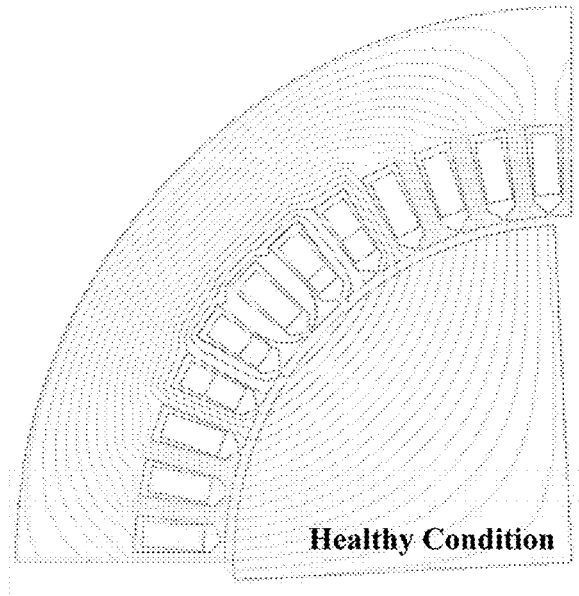
FIGS. 9a through 9d illustrate magnetic flux distribution generated, in both healthy and faulty conditions, by a three-phase, four-pole electric machine according to an embodiment.
Figure 9B:
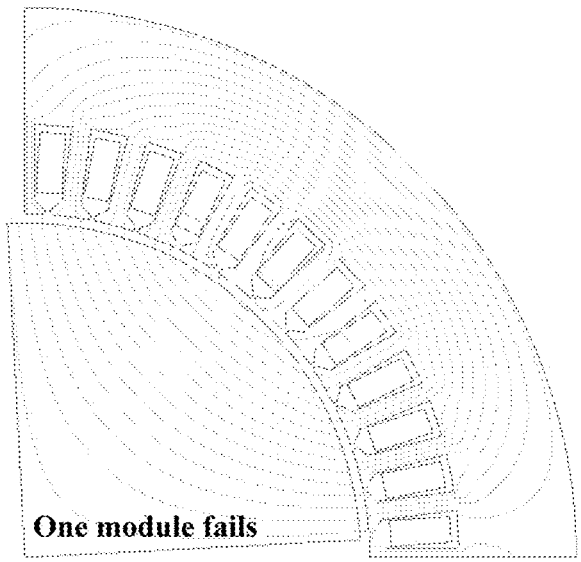
Figure 9C:
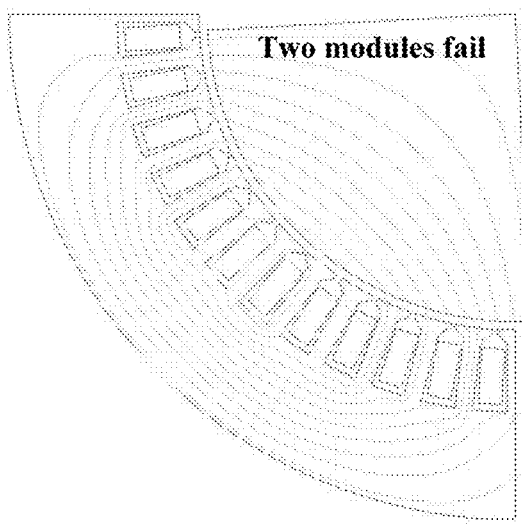
Figure 9D:
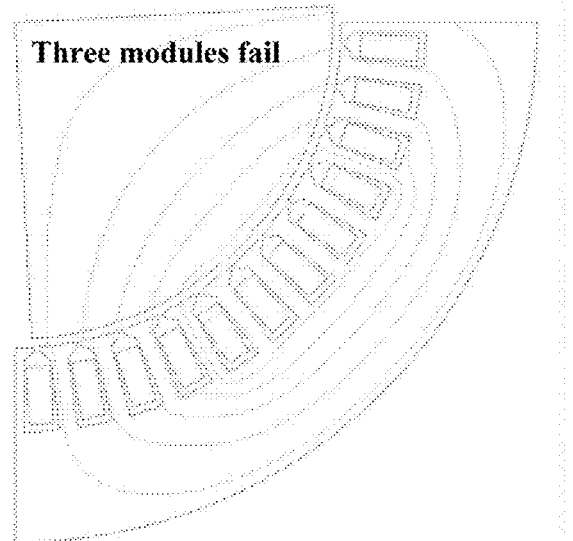

FIGS. 9a through 9d illustrates magnetic flux distribution generated, in both healthy and faulty conditions, by a three-phase, four-pole electric machine according to an embodiment of the present disclosure. FIG. 9a illustrates the magnetic flux distribution generated under healthy conditions, and FIGS. 9b, 9c, and 9d illustrate the magnetic flux distribution generated under the conditions of the failure of a single drive module, the failure of two drive modules, and the failure of three drive modules, respectively. As can be seen in FIGS. 9a-9d, as the number of operating drive modules decreases due to faults, the density of the magnetic field lines, and thus the strength of the magnetic field, decreases. However, in all four cases the motor flux distribution remains symmetric four pole. This ensures that the integrated three-phase, four-pole motor drive system according to an embodiment of the present disclosure can maintain balanced operation of the machine even under faults. Depending on the application, the motor and modules can also be designed for higher power ratings so that, in the event that any inverter exhibits a fault, the remaining drive modules can still provide full power.

In addition to its fault tolerant features, the drive system concepts described can offer improved performance via independent control of each individual drive module. Due to such independent control, excitation for a particular phase of each module can be shifted by a desired phase angle and/or a phase angle that depends on the stator slot pitch in electrical degrees. This can help to achieve a higher winding factor, and therefore, a higher average torque. Predetermined phase angles, for example, of 30 degrees can be used. Alternatively, calculated phase angles may also be used. Overall, independent control of individual drive modules can provide lower torque ripple. Phase excitations (for phases A, B, and C) for drive module n (for $n=1:N_{inv}$) can be provided according to the following equations:

$$I_{An} = I_M \cos(\omega t - m*\theta_{shift});$$

$$I_{Bn} = I_M \cos(\omega t - m*\theta_{shift} + 2*pi/3);$$

$$I_{Cn} = I_M \cos(\omega t - m*\theta_{shift} - 2*pi/3); \text{ and}$$

$$m = 0:\max(q, N_{inv}) - 1.$$

Here $$\theta_{shift} = \frac{q*\theta_{slot}}{N_{inv}},$$

and $\theta_{slot}$ is the machine's stator slot pitch in electrical degrees.

Figure 10:
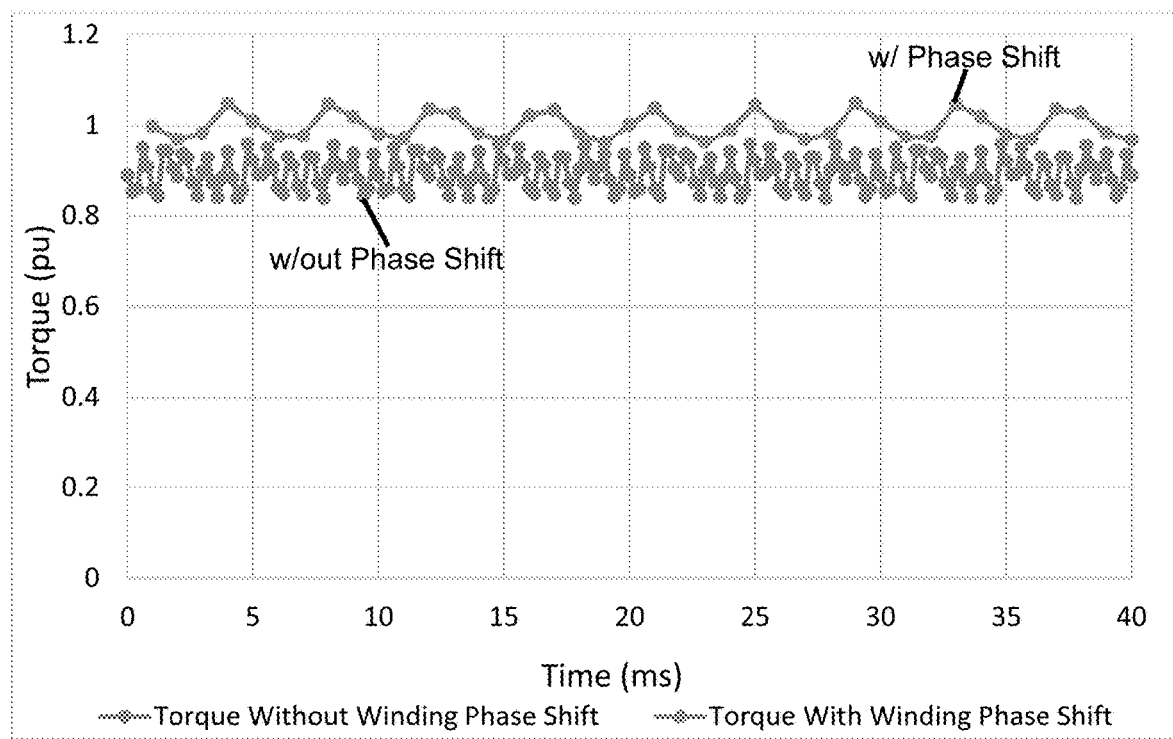
FIG. 10 is a graph of torque versus time for an electric machine according to an embodiment.

FIG. 10 is a graph of torque versus time for an electric machine according to an embodiment of the present disclosure both with and without phase shifting of windings of different drive modules. As indicated in FIG. 10, phase shifting the windings of the different drive modules can increase average torque by approximately 10% and can decrease torque ripple by 34%.

The multi-drive module electric machines described herein provide for a number of advantages. The fault tolerance of the multi-drive module electric machines described herein is significantly improved as the machine can operate with balanced phase currents and MMFs under multiple fault conditions, and operation can be sustained as long as at least one module is operating. The balanced phase currents and MMFs ensure smooth torque profiles even under different fault conditions.

Independent control of different drive modules enables high performance operation during normal operating conditions. By providing a phase shift equal to a machine electrical stator slot pitch, the proposed multi-drive module electric machines can enhance machine average torque and torque ripple performance. Furthermore, independent control of different drive modules enables compensation for torque drops caused by faults and can reduce peak magnetic stress and hence the machine core loss. Independent control further provides control flexibility and enables opportunities to bring individual inverter modules online or offline based on the torque-speed requirement of the machine—thereby optimizing drive utilization and enhancing system efficiency under variable load conditions. Furthermore, operation of less than all drive modules under low load conditions further increases efficiency.

As compared with conventional motor drives, inverter losses are more distributed due to the distribution of the stator windings and power supplies along the periphery of the machine. Improved loss distribution of the proposed motor drive system makes thermal management easier than with conventional drive systems, and system cooling can be further improved with cooling channels positioned to maintain contact between the higher loss components.

Finally, the use of uniform shape hairpin/bar conductors at the crown end enables desirable state-of-the-art conductor fabrication and automated stator manufacturing, and the use of standard three phase drive modules that have off-the-shelf package availability results in decreased complexity as compared with alternative fault tolerant solutions.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. An electric machine, comprising:
   a rotor; and
   a stator, the stator including:
      a stator core, the stator core having a plurality of slots; and a plurality of respective drive modules ($N_{inv}$), the plurality of respective drive modules being configured to collectively produce an aggregate rotating magnetic field, each respective drive module including:
- a power supply configured to generate a respective poly-phase alternating current (AC) output, the respective poly-phase AC output having a plurality of respective phases, and
- a plurality of respective conductor windings, each respective conductor winding including a plurality of respective conductors, each respective conductor configured to carry a respective phase of the respective poly-phase AC output;

wherein each respective drive module is configured to generate a respective rotating, poly-phase, multipole magnetic field, the respective rotating, poly-phase, multipole magnetic field being a superimposition of a plurality of respective mono-phase, multiple magnetic fields, each respective mono-phase, multipole magnetic field being generated by a respective conductor of the respective conductor winding carrying a respective phase of the respective poly-phase AC output, wherein each respective rotating, poly-phase, multipole magnetic field is configured to interact with the rotor to produce a respective magneto-motive force (MMF) that causes the rotor to rotate, and wherein the aggregate rotating magnetic field is a superimposition of the plurality of respective rotating, poly-phase, multipole magnetic fields generated by the plurality of respective drive modules.

2. The electric machine as claimed in claim 1, wherein each respective power supply includes a respective poly-phase inverter configured to convert a direct current (DC) input into the respective poly-phase AC output.

3. The electric machine as claimed in claim 2, further comprising a DC bus, wherein the plurality of drive modules includes drive modules that are connected in parallel to the DC bus, and wherein the DC bus is configured to supply the DC input to each respective poly-phase inverter.

4. The electric machine as claimed in claim 1, wherein each respective drive module is configured to be operated independently from each other respective drive module.

5. The electric machine as claimed in claim 1, wherein the plurality of slots of the stator core is a number Q of slots, wherein the plurality of respective drive modules is a number $N_{inv}$ of respective drive modules, wherein each respective rotating, poly-phase, multipole magnetic field has a number 2P of poles, and wherein the plurality of respective phases of each respective poly-phase AC output is a number n of phases, wherein the numbers Q, $N_{inv}$, P, and n are positive integers.

6. The electric machine as claimed in claim 5, wherein the stator core is divided into the number 2P of respective sectors, each respective sector including an integer number Q/2P of the Q slots.

7. The electric machine as claimed in claim 6, wherein each respective sector is divided into the number n of respective segments, wherein each respective segment includes a number q of slots, wherein $$q = \frac{\frac{Q}{2P}}{n},$$

and wherein q is a positive integer.

8. The electric machine as claimed in claim 7, further comprising a plurality of conductors (Z1) per each of the plurality of stator slots, and wherein $N_{inv}$ is selected such that $N_{inv} \in N$ and modulo $(Z1*q, N_{inv})=0$, wherein N is the set of natural numbers.

9. The electric machine as claimed in claim 7, wherein each of the q slots of each respective segment is occupied by a respective conductor of the respective conductor winding of a different respective drive module.

10. The electric machine as claimed in claim 9, wherein each respective phase of each respective poly-phase AC output of a respective drive module corresponds to a single phase of the respective poly-phase AC output of each other respective poly-phase AC output, and wherein the q slots of each respective segment are occupied by respective conductors that carry corresponding phases of the respective poly-phase AC outputs of the plurality of drive modules.

11. The electric machine as claimed in claim 9, wherein each respective drive module is assigned a drive module number, wherein the slots of each respective segment are assigned to respective conductors of respective drive modules in an order corresponding to the assigned drive module numbers, and wherein the order of respective conductors of respective drive modules is identical for every segment.

12. The electric machine as claimed in claim 1, wherein each respective poly-phase AC output of a respective drive module has a phase shift relative to each other respective poly-phase AC output.

13. The electric machine as claimed in claim 6, wherein each drive module is assigned a number i, wherein i=1:$N_{inv}$, wherein the respective poly-phase AC output of the ith respective drive module has a phase shift $$\theta_{shift} = \frac{q * \theta_{slot}}{i},$$

wherein $\theta_{slot}$ is the slot pitch, in electrical degrees, of each of the plurality of respective conductor windings.

14. The electric machine as claimed in claim 1, further comprising a controller configured to control each of the drive modules independently of the other drive modules.

15. The electric machine as claimed in claim 14, the controller being configured to:
- determine that a fault has occurred in a respective drive module;
- shut down the respective faulty drive module; and
- adjust one or more operating parameters of the remaining healthy drive modules.

16. The electric machine as claimed in claim 14, the controller being configured to:
- determine that a load demanded of the electric machine falls below a threshold value, and
- in response to determining that the demanded load falls below the threshold value, shut down one or more of the plurality of respective drive modules, and
- adjust one or more operating parameters of the remaining active drive modules.

17. The electric machine as claimed in claim 14, the controller being configured to:
- determine a torque-speed requirement demanded of the electric machine; and
- select, based on the demanded torque-speed requirement, one or more of the plurality of respective drive modules to be operated and operating parameters for each of the one or more respective drive modules to be operated.

18. The electric machine as claimed in claim 1, wherein each respective conductor is a hairpin bar conductor or a stranded coil conductor.

19. The electric machine as claimed in claim 1, wherein each respective conductor winding is a wave winding of a lap winding.

20. A method for operating an electric machine, the method comprising:
   independently controlling a plurality of respective drive modules to generate an aggregate rotating magnetic field, the aggregate rotating magnetic field being a superimposition of a plurality of rotating, poly-phase, multipole magnetic fields, each respective rotating, poly-phase, multipole magnetic field being generated by a single respective drive module,
   wherein each respective drive module includes a power supply configured to generate a respective poly-phase alternating current (AC) output, the respective poly-phase AC output having a plurality of respective phases, and
   wherein each respective drive module is connected to a plurality of respective conductor windings, each respective conductor winding including a plurality of respective conductors, each respective conductor configured to carry a respective phase of the respective poly-phase AC output;
   wherein each respective rotating, poly-phase, multipole magnetic field is a superimposition of a plurality of respective mono-phase, multiple magnetic fields, each respective mono-phase, multipole magnetic field being generated by a respective conductor of the respective conductor winding carrying a respective phase of the respective poly-phase AC output,
   wherein each respective rotating, poly-phase, multipole magnetic field is configured to interact with a rotor to produce a respective magneto-motive force (MMF) that causes the rotor to rotate;
   determining that a fault has occurred in a respective drive module;
   shutting down the respective faulty drive module; and
   adjusting one or more operating parameters of the remaining healthy drive modules.

* * * * *